(12) United States Patent
Martin

(10) Patent No.: US 6,760,651 B2
(45) Date of Patent: Jul. 6, 2004

(54) METHOD OF MONITORING THE SERVICE LIFE OF A CERAMIC BRAKE DISK

(75) Inventor: Roland Martin, Aalen (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 88 days.

(21) Appl. No.: 10/114,332

(22) Filed: Apr. 3, 2002

(65) Prior Publication Data

US 2002/0161494 A1 Oct. 31, 2002

(30) Foreign Application Priority Data

Apr. 4, 2001 (DE) .......................... 101 16 662

(51) Int. Cl.[7] .............................................. F16D 66/00
(52) U.S. Cl. ...................... 701/29; 701/35; 188/1.11 W
(58) Field of Search ........................... 340/454; 701/29, 701/30, 31, 35, 70; 188/1.11 W, 1.11 L, 1.11 E, 71.5, 162; 192/70.25

(56) References Cited

U.S. PATENT DOCUMENTS 6,471,015 B1 * 10/2002 Ralea et al. ............... 188/1.11

2002/0046909 A1 4/2002 Sokoll et al. ........... 188/1.11 W

FOREIGN PATENT DOCUMENTS

| DE | 34 07 716 | 9/1985 |
| DE | 3707980 | 9/1988 |
| DE | 42 26 010 | 2/1994 |
| DE | 43 16 993 | 11/1994 |
| DE | 10029238 | 12/2001 |
| EP | 0598997 | 6/1994 |
| EP | 1124073 | 8/2001 |
| FR | 2794825 | 12/2000 |

OTHER PUBLICATIONS

European Search Report mailed Aug. 28, 2003.

* cited by examiner

*Primary Examiner*—Richard M. Camby
(74) *Attorney, Agent, or Firm*—Crowell & Moring LLP

(57) ABSTRACT

A method of monitoring the service life of a ceramic brake disk, in which the load of the brake disk is computed by way of the actual sensed braking and driving dynamic characteristics and is compared with a definable reference value for the service life.

3 Claims, 2 Drawing Sheets

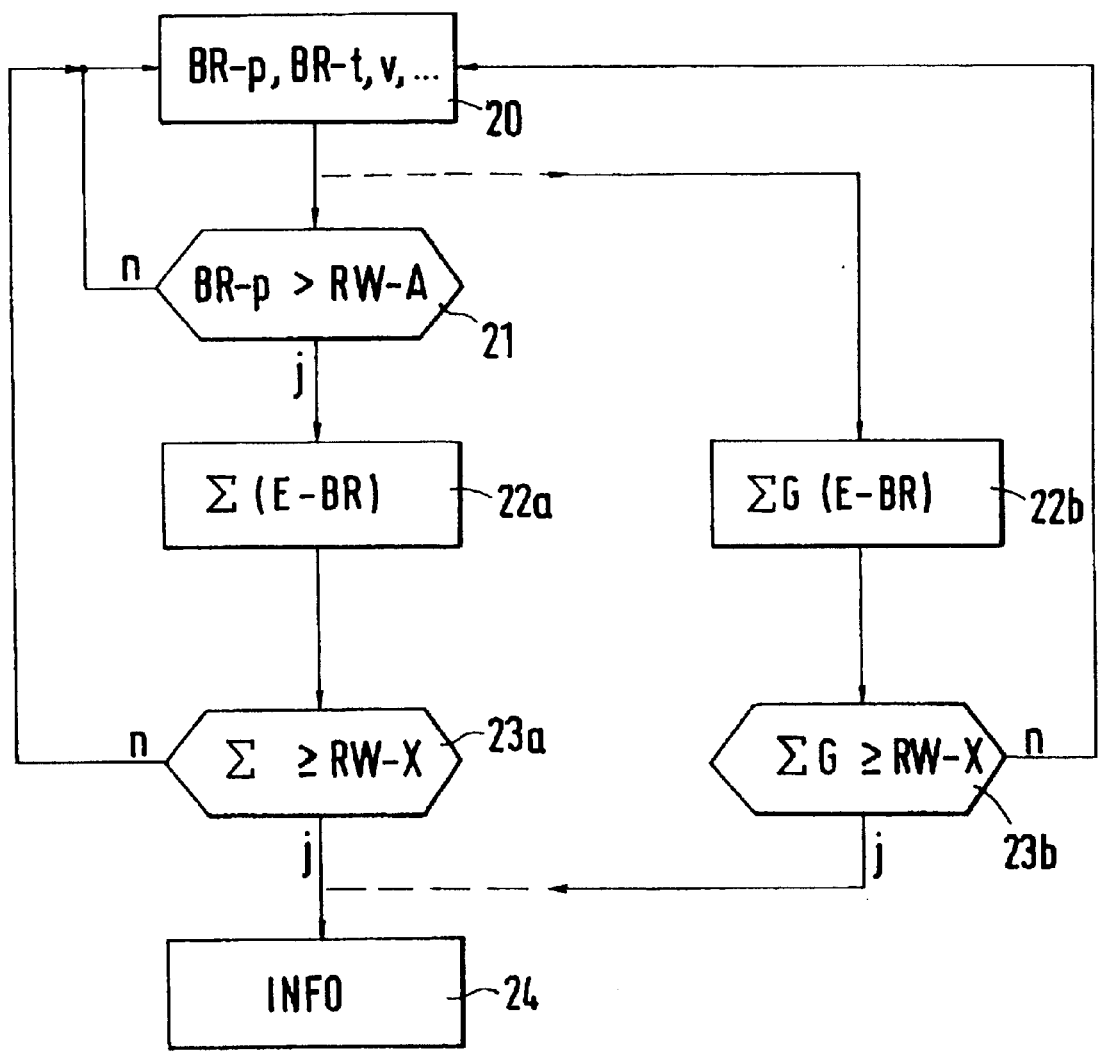

METHOD OF MONITORING THE SERVICE LIFE OF A CERAMIC BRAKE DISK

BACKGROUND AND SUMMARY OF THE INVENTION

This application claims the priority of German Application No. 101 16 662.1, filed Apr. 4, 2001, the disclosure of which is expressly incorporated by reference herein.

The invention relates to a method of monitoring the service life of ceramic brake disks.

German Patent Document DE 42 26 010 A1 discloses a method of monitoring the service life of vehicle components, in which the components have electric load sensors in highly stressed areas so that, during the driving operation, their obtained values can be transmitted to and stored in an analysis unit which provides a continuous analysis of the added values. Strain gauges are used as the load sensors for this method.

In comparison to the known method, the method according to the invention has the advantage that no additional load sensors are used. On the contrary, an analysis of the known sensed operating quantities, which already exists in the control unit, takes place such that as a result of a critical consideration of each individual braking operation and an adding-up of these individual braking operations, precise information can be obtained concerning the pre-existing wear of the brake disk. On the basis of this sensed wear, the service life of the brake disk can then be determined and, when a definable reference value is reached, the driver can be notified. This notification can take place visually or acoustically in the center console of the vehicle and indicate, for example, that a visit to the repair shop is due.

Other objects, advantages and novel features of the present invention will become apparent from the following detailed description of the invention when considered in conjunction with the accompanying drawings.

BRIEF DESCRIPTION OF THE DRAWINGS

An embodiment of the method according to the invention is illustrated in the figure and will be explained in detail in the following description.

FIG. 2 is a schematic view of the processes steps, a first possibility of the analysis being indicated in a branch 2a and a second alternative possibility of the analysis being indicated in a branch 2b.

DETAILED DESCRIPTION OF THE PREFERRED EMBODIMENT

Figure 1:
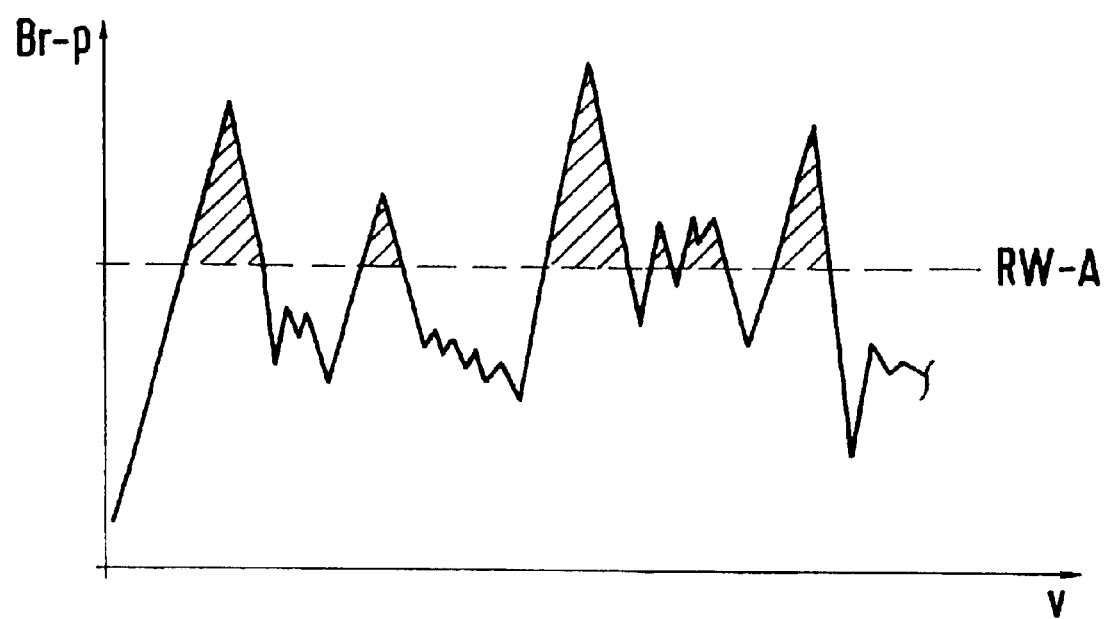
FIG. 1 is a diagram of the course of the brake pressure over the driving speed.

FIG. 1 shows a diagram of the brake pressure and the driving speed, so that the driving speed v is shown on the abscissa and the brake pressure BR-p is shown on the ordinate. According to the driving speed v and the actual operating or driving conditions, during each individual braking E-BR, a corresponding brake pressure BR-p is built up which acts upon the brake disks. In the diagram according to FIG. 1, a definable reference value RW-A is entered by a broken line which, for example, indicates the amount of the brake pressure at which the load becomes critical for the brake disks. The ranges in which the brake pressure BR-p exceeds this permissible reference value RW-A are shaded in FIG. 1.

FIG. 2 is a schematic view of the individual process steps, a first possibility of analyzing the sensed quantities being explained by means of branch 2a. In a first operating step 20, the driving speed v, the brake pressure BR-p and the braking period BR-t as well as optionally additional operating parameters of the vehicle operation are sensed. The brake pressure BR-p of each individual braking E-BR is compared in the subsequent query 21 with the definable critical reference value for the brake pressure RW-A. If this reference value RW-A was not exceeded, the process again jumps to operating step 20, and the next quantities are sensed. If the reference value RW-A is exceeded, the values of the individual brakings E-BR are added up in operating step 22a. This thus formed sum $\Sigma$ of all individual brakings E-BR which exceed the reference value RW-A, is compared in the subsequent query 23a with an additional definable reference value RW-X. This definable reference value RW-X is the value which indicates a maximally permissible load of the brake disk. If the sum of the individual brakings has exceeded this value RW-X, information INFO is supplied to the driver in an operating step 24 in the form of an indication which may visually and/or acoustically be arranged in the center console of the driver. Simultaneously, for example, in a control unit which is not shown, the actual mileage number can be stored at which the definable reference value RW-X was exceeded.

As an alternative to this just explained approach, branch 2b shows a second analyzing possibility. Here, every sensed brake pressure BR-p was not compared with the amount of the first reference value RW-A. However, as in branch 2a, the actual operating quantities for the braking operation are sensed in operating step 20. However, then, in an operating step 22b, all values of the individual braking operations are added up and this total sum $\Sigma G$ is compared with the definable reference value RW-X for a maximally permissible load of the ceramic brake disk. If this reference value RW-x was not exceeded, the process returns to the start of the process, and the next braking operation is sensed in operating step 20. However, if the reference value RW-X was exceeded, as explained above, the information is supplied to the driver in operating step 25.

The reference values for this method and thus the limit values for defining the service life of the ceramic brake disk are determined, for example, on the testing stand on the basis of test vehicles and can then be adapted to special situations in the application.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of monitoring the service life of a ceramic brake disk in a motor vehicle, comprising the steps of: sensing the driving speed, the brake pressure and the braking period for individual braking operation;

adding-up of the brake pressure of selected ones of said individual braking operations (E-BR), including the step of comparing each of said individual braking operations with a second predetermined reference value and providing ones of said individual braking operations which exceed said second predetermined reference value as said selected ones of said individual braking operations, and thus forming a sum ($\Sigma$, $\Sigma G$);

comparing said sum with a predetermined reference value (RW-X); and providing at least one of a visual and acoustic indication when said sum exceeds said predetermined reference value.

2. The method according to claim 1, wherein said indication is information (INFO) concerning the achieved maximally permissible service life of a brake disk and a driver of said vehicle receives information that a visit to a repair shop is due.

3. The method according to claim 1, wherein a reference value for the maximally permissible service life is determined by at least one of a testing stand and driving tests.

* * * * *